United States Patent [19]

Jennings

[11] Patent Number: 4,600,704
[45] Date of Patent: Jul. 15, 1986

[54] CATALYST

[75] Inventor: James R. Jennings, Yarm, England

[73] Assignee: Imperial Chemical Industries PLC, London, England

[21] Appl. No.: 652,052

[22] Filed: Sep. 19, 1984

[30] Foreign Application Priority Data

Oct. 19, 1983 [GB] United Kingdom ............... 8327933

[51] Int. Cl.$^4$ .................. B01J 23/06; B01J 23/72; B01J 23/74
[52] U.S. Cl. .................. 502/318; 502/324; 502/331; 502/342; 502/343; 502/345; 502/346
[58] Field of Search .............. 502/24, 342, 343, 345, 502/318, 324, 331, 346; 423/27

[56] References Cited

U.S. PATENT DOCUMENTS

| | | | |
|---|---|---|---|
| 3,232,744 | 2/1966 | Munekata et al. | 75/2 |
| 3,790,505 | 2/1974 | Casey et al. | 502/342 |
| 3,793,429 | 2/1974 | Queneau et al. | 423/34 |
| 3,966,462 | 6/1976 | Posel et al. | 75/101 BE |
| 4,279,781 | 7/1981 | Dienes et al. | 502/343 |

FOREIGN PATENT DOCUMENTS 2319361 11/1974 Fed. Rep. of Germany .
56-8657 2/1981 Japan .

Primary Examiner—W. J. Shine
Attorney, Agent, or Firm—Cushman, Darby & Cushman

[57] ABSTRACT

A substantially iron-free copper nitrate solution is made by dissolving a copper-containing solid catalyst composition such as a used copper-zinc oxide-alumina methanol synthesis catalyst in nitric acid and controlling the acid concentration at a level such that any iron oxide present in the composition remains substantially undissolved. The acid concentration during dissolution is preferably under 4 molar. Alternatively or additionally the terminal pH is greater than 1.0. The resulting solution is pure enough for reconversion to catalyst by co-precipitation.

7 Claims, No Drawings

CATALYST

This invention relates to a catalyst and in particular to the recovery of metal values from used catalysts and thereafter, if desired, conversion thereof into fresh catalyst.

Whereas considerable quantities of nitrates of copper and zinc are used in making catalysts containing metallic copper and zinc oxide, no satisfactory method of recovery of compounds of those metals from used catalyst has been practised. In U.K. Pat. Nos. 1178004 and 1262299 it is proposed to react spent catalyst with aqueous ammonium carbonate and to precipitate basic carbonates of copper and zinc from the resulting solution by heating it. This is a different precipitation method from what is commonly used for making fresh catalyst and does not in general give a catalyst of the same quality. Moreover, it produces an effluent containing ammonium ions, which cannot be easily disposed of. In Japanese Patent publication No. 81008657 (public disclosure No. 52059090) it is proposed to calcine used catalyst at over 500, preferably over 700° C., dissolve the residue in acid, separate undissolved material and react the solution with an alkaline precipitant to give compounds convertible to oxides and thereafter to catalyst.

According to the invention a substantially iron-free solution containing copper nitrate is made from a solid catalyst composition comprising copper in the form of metal and/or oxide and an oxide of at least one other metal by a process which comprises reacting the composition with nitric acid and controlling the acid concentration at least at the end of such dissolution at such a level that any iron oxide present in the composition remains substantially undissolved.

Such iron oxide present in the composition can be an intentional constituent as in proposed shift or hydrogenation catalysts, but is more often a contaminant, resulting from corrosion of plant used in making the composition, decomposition of iron carbonyl during use of the catalyst in a plant of steel construction or accidental contamination in other ways. The iron content is typically in the range 100 to 2000 ppm w/w in a used catalyst composition. The method is, however, applicable to iron-free compositions.

The acid concentration is maintained preferably at least than 6 molar, especially less than 5 molar.

The terminal pH is preferably greater than 1.0, especially greater than 2.0, for example at least 2.5, but still sufficiently low to dissolve at least 90% of the copper initially present. It can be arrived at by controlled feeding of nitric acid to the catalyst composition but is more conveniently arrived at by using more concentrated nitric acid until dissolution is substantially complete and then raising the pH to the desired level by adding either alkali or further spent catalyst. The use of acid more concentrated than 5M is desirable if the catalyst composition contains metallic copper. In any event the acid quantity used is preferably not more than for example 90-99% of what would be equivalent to the dissolvable constituents. The addition of alkali precipitates unwanted metal ions, for example those of iron, aluminium and chromium and to a small extent copper as mentioned and also zinc. The precipitate and/or undissolved material can be recycled to the dissolution, for further recovery of copper and zinc contained therein, but should be discarded from time to time to prevent excessive build up of unwanted constituents.

Since selectivity against dissolution of iron oxide is in general a kinetic effect, it will be appreciated that the time and temperature are also controlled to avoid excessive dissolution of iron oxide. However, the specified acid concentration and pH are found to correspond to convenient times up to for example 48 hours especially 24 hours and temperature up to boiling point at 1 bar abs. pressure especially up to 70° C.

Before the dissolution the catalyst composition is preferably oxidised to convert metallic oppper to copper oxide. This has the effect that less nitric acid or less concentrated nitric acid need be used and no provision need be made to handle substantial quantities of nitrogen oxides. Such oxidation could be for example by means of hydrogen peroxide, but is most conveniently effected by heating the catalyst composition in the presence of oxygen, for example in air, at for example 300°–500° C. As a result of using the acid of limited concentration and/or the specified terminal pH, it appears that heating at over 500° C. to drive off sulphur compounds becomes unnecessary.

Among the oxides that can be present in addition to copper are those of the trivalent or optionally trivalent elements aluminium, titanium, vanadium, chromium and manganese and also iron as mentioned. Instead of or in addition to these, zinc oxide is a frequent constituent of copper catalysts: in this event the dissolution and the subsequent pH adjustment (if any) are carried out preferably such that at least 50% of the zinc is recovered. The resulting copper nitrate solution then contains also zinc nitrate, and can be used for making further quantities of the catalyst composition.

If a preliminary calcination is carried out this can assist by insolubilising the trivalent oxides as such or by spinel formation with divalent oxides, and by insolubilising unwanted divalent oxide such as nickel oxide by spinel formation.

The copper nitrate solution produced by the method of the invention contains iron, if at all, at a concentration of preferably less than 0.02% w/w of the copper, both calculated as metal, and especially less than 0.005% w/w. The solution can thus be adequately pure for making further quantities of catalyst. The catalyst can be made for example by thermally decomposing the nitrate on or mixed with a support material. Preferably it is made by double decomposition with an alkaline precipitant such as hydroxide, carbonate, bicarbonate or oxalate of an alkali metal or ammonium or possibly an alkali metal aluminate or vanadate. If desired, other metal salts, especially of aluminium, can participate and the order in which the metal salts and precipitant are introduced can be chosen so as favour selective interaction of the components, for example of the oxides of zinc and aluminium. If double decomposition is used, the pH of the resulting suspension is preferably between 1 unit on the acid side and 2 units on the alkaline side, of neutrality. If the precipitant is an alkali metal compound, the precipitate is washed preferably to an alkali metal content of less than 0.2% w/w calculated as equivalent $Na_2O$. After such washing, the precipitate is dried, calcined at for example 250°–350° C. to produce the metal oxides and pelleted. The pelleted material is a catalyst precursor and is converted to active catalyst by reduction with dilute hydrogen at under 250° C.

Among the catalyst compositions that can be re-converted to copper nitrate solution by the method of the invention are copper-zinc oxide-alumina methanol synthesis or low temperature shift catalyst;

analogous catalysts containing vanadium, chromium or manganese instead of or in addition to alumina;

copper-zinc oxide hydrogenation/dehydrogenation catalysts;

(each of these catalysts typically contains copper and zinc in a ratio 0.4 to 3.0 calculated by metal atoms and 2–40% of the other oxides calculated by metal atoms on the total catalyst)

copper oxide hydrogen or CO removal reagents;

copper chromite hydrogenation catalysts.

Usually these will be catalysts that have lost activity in normal use, but they can be for example off-specification materials or accidentally damaged materials.

EXAMPLE 1

A sample (1 Kg) of pelleted copper-zinc oxide-alumina (4:2:1 by metal atoms) methanol synthesis catalyst that had been used for 24 months in a methanol synthesis plant and then discharged was heated in air at 400° C. overnight to oxidise metallic copper to oxide. Then aliquots (25 g each) of the treated sample were crushed and leached with nitric acid at various concentrations, temperatures and times. The resulting solutions were filtered and analysed for major constituants and impurities. The results are shown in Table 1.

TABLE 1

| Acid excess % | Acid concn. (molar) | pH of filtrate | Temp. °C. | Time h | Cu % | Zn % | Al ppm | Fe ppm | S ppm | Cl ppm |
| --- | --- | --- | --- | --- | --- | --- | --- | --- | --- | --- |
| large | 15 | 0 | 25–50 | 2 | 9.6 | 4.9 | 900 | 22 | 5 | 30 |
| 110 | 6 | 0.3 | 20 | 18 | 11 | 5.3 | 1200 | 23 | 6 | 34 |
| 15 | 4.5 | 2.0 | 20 | 18 | 6.8 | 3.6 | 540 | .01 | 21 | 32 |
| 10 | 4.5 | 2.5 | 85 | 3 | 7.7 | 4.0 | 750 | 2.2 | 18 | 40 |
| 10 | 3.75 | 2.4 | 20 | 3 | 5.9 | 4.1 | 500 | 3.5 | 18 | 30 |
| 10 | 4.5 | 2.5 | 85 | 3 | 7.7 | 4.0 | 750 | 2.2 | 18 | 40 |
| 110* | 4.5 | 0.2 | 85 | 3 | 5.0 | 2.5 | 1000 | 2.2 | 12 | 15 |

*doubled volume

It is evident that an excess of acid at high concentration (6M or more) is undesirable in dissolving a substantial quantity of iron, even though the copper and zinc concentrations reached are high. If the pH is terminally above 1.0, for example 2.0 to 2.5 the concentration of iron reached is much less and would produce no undesirable effect in a methanol synthesis catalyst. Alternatively, if a relatively low concentration of copper and zinc can be tolerated, an excess of acid of moderate concentration can be used, without dissolving too much iron.

EXAMPLE 2

The procedure of Example 1 was repeated using two samples each of 250 g. The second filtrate was subdivided and one part of it adjusted to pH 2.5 by means of sodium hydroxide solution. The operating conditions and solution concentrations are shown in Table 2.

TABLE 2

| Acid concn (molar) | pH of filtrate | Temp. °C. | Time h | Cu % | Zn % | Al ppm | Fe ppm | S ppm | Cl ppm |
| --- | --- | --- | --- | --- | --- | --- | --- | --- | --- |
| 4.3 | 1.1 | 20 | 5 | 3.8 | 1.8 | 280 | 15 | 20 | 20 |
| 4.3 | 1.1 | 20 / 85 | 4 / 1 | 3.8 | 1.9 | 500 | 17 | 10 | 15 |
| 4.3 | 2.5 (adjusted) | 20 / 85 | 4 / 1 | 2.8 | 1.4 | 0.3 | 0.3 | 20 | 18 |

It is evident that the adjustment of pH to 2.5 decreases the iron and aluminium content of the filtrate to a very low level. It also decreases the copper and zinc contents substantially but, since a decrease in copper and zinc content of about 25% is accompanied by a decrease in iron content by a factor of more than 5, the residue can be recycled to further dissolution and further copper and zinc recovered.

CATALYST TESTS

The solution of the nitrates of copper and zinc prepared as described in Example 2 was adjusted to a copper to zinc ratio 3:1 by weight by addition of copper nitrate. It was then adjusted to 65° C. and co-precipitated with sodium carbonate solution. The resulting slurry was mixed with a slurry made by co-precipitating zinc nitrate with sodium aluminate in aqueous solution, the proportions being such as to introduce copper, zinc and aluminium in the overall ratio approximately 60:25:15 by metal atoms. The mixed precipitate was collected on a filter and washed to an $Na_2O$ content of 0.1% w/w. It was then calcined for 6 h at 300° C., crushed, mixed with 2% w/w of graphite and compressed into cylinders 3.6 mm high×5.4 mm diameter. A sample of these cylinders was crushed to pass an 18 mesh BSS sieve and a laboratory reactor was charged with about 2 g of material in the sieve range 18 to 25 BSS. The charge was heated to 150° C. in nitrogen, reduced by feeding hydrogen at an initially low but increasing percentage into the nitrogen, while raising the temperature continuously to 240° C. Then the nitrogen/hydrogen mixture was shut off and replaced by methanol synthesis gas (% v/v: CO 10.0 $CO_2$ 3.0 $H_2$ 67.0 $N_2$ 20.0) at 50 bar abs pressure, space velocity 40,000 $h^{-1}$.

Table 3 shows the relative activity and volume activity (percentage of methanol in the reacted gas per $cm^3$ of catalyst), in comparison with a commercially manufactured catalyst:

TABLE 3

|  | Invention | | Commercial | |
|---|---|---|---|---|
| Sample weight, g | 2.10 | | 2.17 | |
| volume, cm$^3$ | 2.0 | | 2.0 | |
| Hours on line | 10 | 168 | 10 | 168 |
| Relative activity | 1.18 | 0.95 | 1 | 0.76 |
| Volume activity | 2.36 | 1.90 | 2.0 | 1.58 |

It is evident that the catalyst made from recovered metal nitrates is at least as active and stable as the commercially manufactured catalyst.

I claim:

1. A process for producing a substantially iron-free solution containing copper nitrate from a solid catalyst composition comprising copper in the form of metal and/or oxide and an oxide of at least one other metal selected from the group consisting of iron, zinc, aluminum, titanium, vanadium, chromium and manganese, said process comprising:

reacting the composition with nitric acid in an amount sufficient to dissolve at least 90% of the copper in the composition, controlling the acid concentration at less than 5 molar during the reaction; and/or controlling the nitric acid concentration at the end of the reaction a pH sufficiently low to dissolve at least 90% of the copper initially present; wherein any iron oxide present in the composition remains substantially undissolved and then removing undissolved material by filtration to give a copper nitrate containing solution as the filtrate.

2. A process according to claim 1 in which said acid concentration at the end of said reaction corresponds to a pH greater than 2.0.

3. A process according to claim 3 in which the quantity of acid used is 90–99% of what would be equivalent to the dissolvable constituents of the composition.

4. A process according to claim 1 in which the composition has, before the reaction with nitric acid, been heated in air at 300°–500° C. to oxidise any metallic copper present.

5. A process according to claim 1 in which the composition contains zinc oxide and at least 50% thereof is recovered as zinc nitrate present in the copper nitrate solution.

6. A process according to claim 1 in which the composition is a used copper-zinc oxide-alumina methanol synthesis catalyst.

7. A process for producing a catalyst characterised by reacting with an alkaline precipitant a solution produced by a process according to claim 1 followed by washing, drying, calcination, pelleting and reduction.

* * * * *